Jan. 29, 1957  G. L. KOSKI  2,779,359
PILE CUTTING GUIDE FOR CHAIN SAWS
Filed June 25, 1954  2 Sheets-Sheet 1
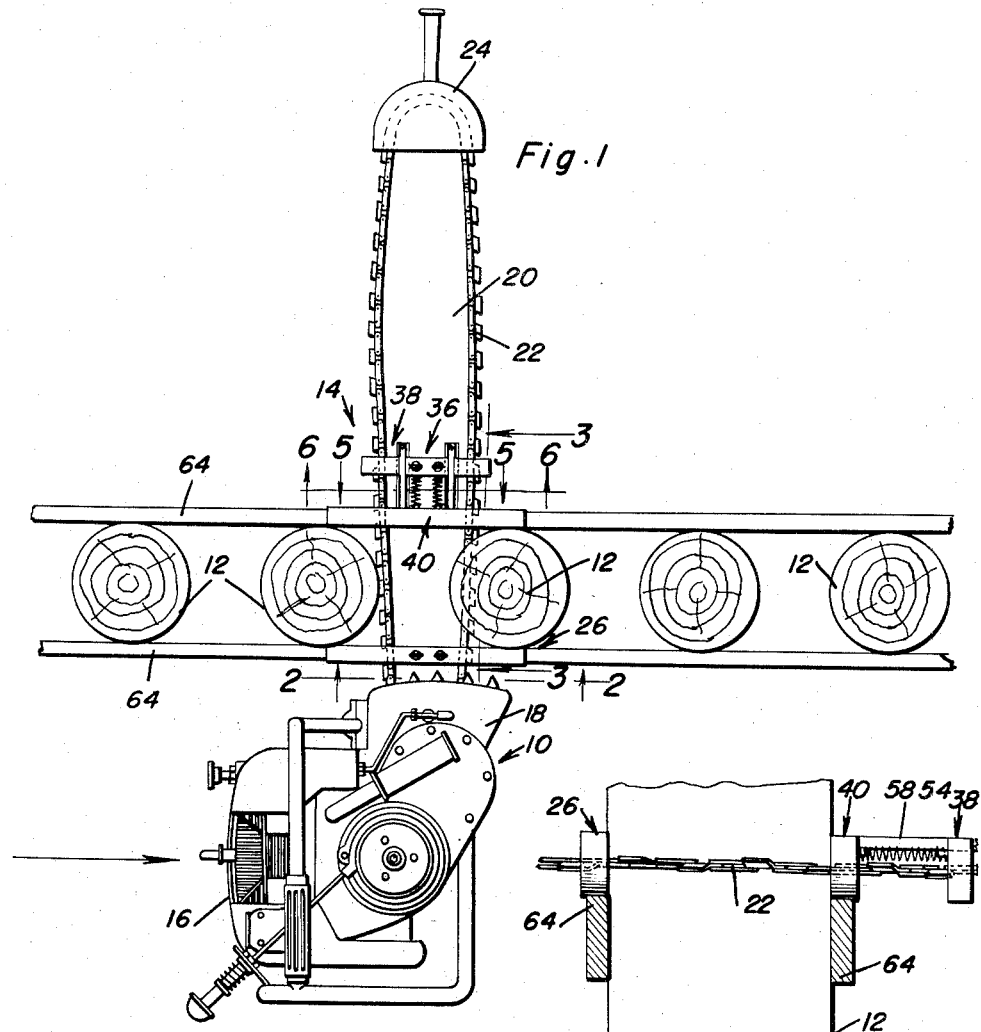
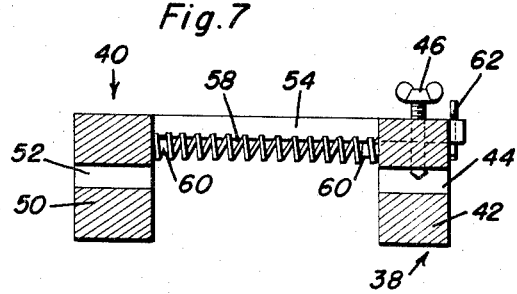
George L. Koski
INVENTOR.
BY *[signatures]*
Attorneys Jan. 29, 1957 G. L. KOSKI 2,779,359
PILE CUTTING GUIDE FOR CHAIN SAWS
Filed June 25, 1954 2 Sheets-Sheet 2
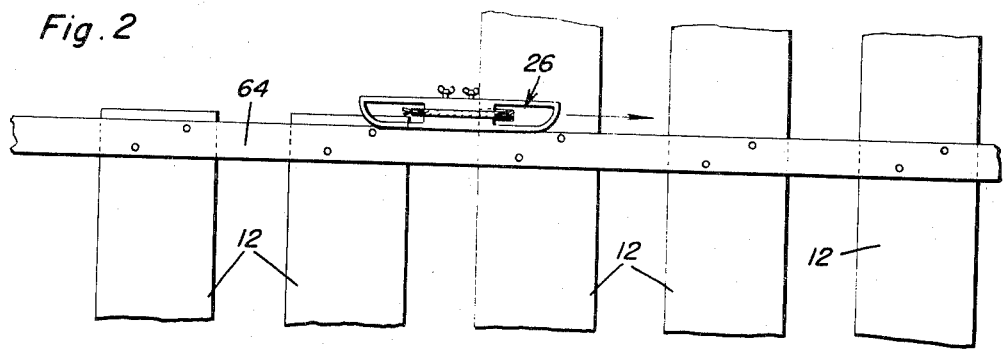
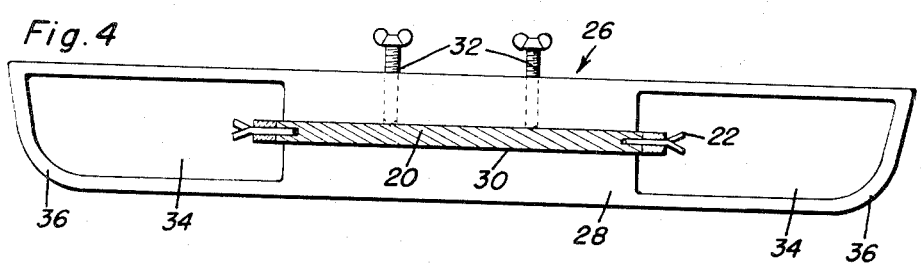
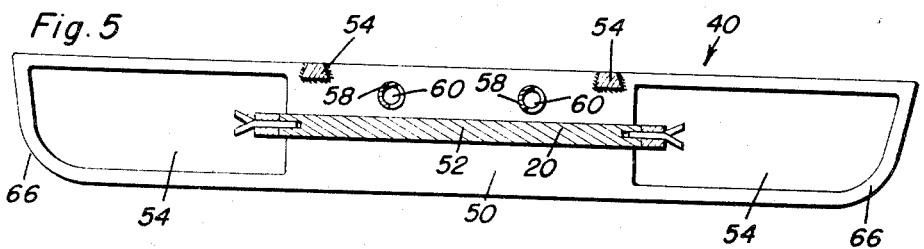
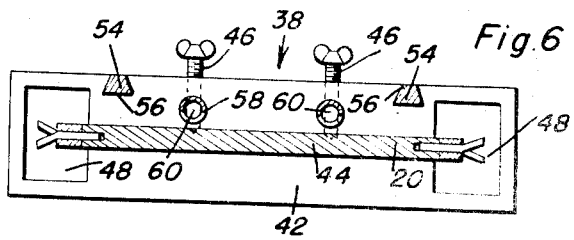
George L. Koski
INVENTOR.

United States Patent Office 2,779,359
Patented Jan. 29, 1957

2,779,359

PILE CUTTING GUIDE FOR CHAIN SAWS

George L. Koski, Fort Bragg, Calif.

Application June 25, 1954, Serial No. 439,320

5 Claims. (Cl. 143—32)

This invention relates in general to improvements in attachments for chain saws, and more specifically to guides which may be mounted on chain saw guide bars.

Although a chain saw is primarily designed for cutting down timber and for cutting the timber into desired lengths, it is readily understandable that a chain saw may possibly be adapted to other uses. It is therefore the primary object of this invention to provide an improved guide for chain saw bars which will permit the utilization of a chain saw for cutting off piling at a desired height.

Another object of this invention is to provide an improved guide for chain saw bars which is so constructed whereby it may be readily attached to bars of chain saws without any modification whatsoever to the bars.

A further object of this invention is to provide an improved guide for chain saw bars, the guide being so constructed whereby portions thereof will engage mounting bars so as to support the chain saw and will receive between parts thereof pilings of different diameters whereby piling may be cut off at a predetermined elevation through the use of a chain saw provided with a guide which is the subject of this invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing a conventional chain saw being utilized in cutting off upper portions of piling, the guide bar of the chain saw being provided with the guide which is the subject of this invention;

Figure 2 (Sheet 2) is a vertical sectional view taken substantially upon the plane indicated by the section line 2—2 of Figure 1 and shows the chain blade of the chain saw in the process of cutting a piling at a predetermined elevation;

Figure 3 is an enlarged fragmentary vertical sectional view taken substantially upon the plane indicated by the section line 3—3 of Figure 1 and shows the relationship of portions of the guide for the chain saw bar with respect to mounting bars secured to the piling being cut;

Figure 4 is an enlarged fragmentary vertical sectional view taken substantially upon the same plane indicated by the section line 2—2 and shows the specific relationship between a first guide member and the saw guide bar;

Figure 5 is an enlarged fragmentary vertical sectional view taken substantially upon the plane indicated by the section line 5—5 of Figure 1 and shows the general details of construction of a guide element of a second guide member;

Figure 6 is an enlarged fragmentary vertical sectional view taken substantially upon the plane indicated by the section line 6—6 of Figure 1 and shows the general details of a first guide element of the second guide member and its relationship to the chain saw guide bar; and Figure 7 (Sheet 1) is an enlarged fragmentary vertical sectional view taken through the second guide member and shows the relationship of the first and second guide element thereof, also being shown is the manner in which the second guide element is resiliently mounted with respect to the first guide element.

Referring now to the drawings in detail, it will be seen that there is illustrated in Figures 1, 2 and 3 a conventional portable chain saw which is referred to in general by the reference numeral 10. The chain saw 10 is illustrated in the process of cutting off upper portions of a plurality of aligned pilings 12 at a desired height. In order to facilitate the cutting off of the piling 12, there is provided the guide which is the subject of this invention, the guide being referred to in general by the reference numeral 14.

The chain saw 10 is of a conventional type and includes a motor 16 which has rigidly formed therewith a transmission 18. Secured to the transmission 18 and extending outwardly therefrom is a blade guide bar 20. Surrounding the blade guide bar 20 and operatively connected to the transmission 18 is a chain blade 22. The end of the blade guide bar 20 remote from the transmission 18 is provided with an auxiliary handle 24.

The guide 14 includes a first guide member which is referred to in general by the reference numeral 26. As is best illustrated in Figure 4, the guide member 26 is in the form of a relatively narrow elongated block 28 which includes a centrally disposed elongated narrow horizontal slot 30. The slot 30 is of a vertical height to have snugly received therein an intermediate portion of the blade guide bar 20. The first guide member 26 is secured on the blade guide bar 20 immediately adjacent the transmission 18 and is retained in place by a pair of adjustable clamping screws 32 which project downwardly through the bar 28 into the slot 30 and engage in clamping relation the upper surface of the blade guide bar 20 to fixedly retain the first guide member 26 thereon.

In order to facilitate the passage of the chain blade 22 through the first guide member 26, the end portions thereof are provided with relatively large openings 34. The openings 34 are of a size to permit not only the passage of the teeth of the chain blade 22, but also chips which may be carried thereby. It is to be noted that the openings 34 communicate with opposite ends of the slot 30 so that the chain saw 10 may operate properly.

The lower corners at the opposite ends of the block 28 forming the first guide member 26 are rounded as at 36. The purpose of this construction will be set forth in more detail hereinafter.

The guide 14 also includes a second guide member which is referred to in general by the reference numeral 36. The second guide member 36 is formed of a first guide element 38 and a second guide element 40.

The first guide element 38 is formed of a relatively short block 42. The central portion of the block 42 is provided with a horizontally disposed elongated narrow slot 44. The slot 44 is of a vertical height to snugly receive an intermediate portion of the blade guide bar 20. In order that the first guide element 38 may be adjustably retained on the blade guide bar 20, there is provided a plurality of vertically disposed clamping screws 46. The clamping screws 46 are threadedly engaged in the upper portion of the block 42 and extend vertically downwardly therethrough into the slot 20 for engagement with the upper surface of the blade guide bar 20. In order to facilitate the passage of both the chain blade 20 and any chips which may be carried by the teeth thereof, there is provided at the opposite ends of the block 42 openings 48. The openings 48 communicate with the slot 44.

Referring now to Figure 5 in particular, it will be seen that the second guide element 40 is formed of a relatively elongated block 50 whose configuration is substantially identical with that of the block 28. The intermediate portion of the block 50 is provided with an elongated horizontally disposed slot 52. The slot 52 has a vertical height of a size to snugly receive the blade guide bar 20 to facilitate guided movement of the second guide element 40 thereon. The block 50 is provided at opposite ends thereof with enlarged openings 53 which communicate with opposite ends of the slot 52. The openings 53 are of a size to receive the chain blade 22 and any chips which may be carried thereby.

In order to facilitate the guided movement of the second guide element 40 on the blade guide bar 20, there is carried by the upper portions of the block 50 a pair of spaced parallel guide bars 54. The guide bars 54 are trapezoidal in cross-section and are rigidly secured to the block 50.

As is best illustrated in Figure 6, the upper portion of the block 42 is provided with openings 56 of trapezoidal cross-section in which the guide bars 54 are guidingly received for sliding movement. It will thus be seen that the guide bars 54 permit the sliding of the second guide element 40 with respect to the first guide element 38 and at the same time, retains it in alignment therewith.

Referring now to Figures 6 and 7 in particular, it will be seen that extending between the first guide element 38 and the second guide element 40 is a pair of spaced parallel compression springs 58. The compression springs 58 are disposed between the two guide elements and are carried by opposed pins 60. In order to limit the movement of the second guide element 40 away from the first guide element 38 due to the urgence of the springs 58, the guide bars 54 are provided at their ends with pins 62 for limiting the sliding movement of the guide bars 54 through the lock 42.

From the foregoing description of the first guide member 26 and the second guide member 36, it will be readily apparent that the auxiliary handle 24 must first be moved before the guide 14 can be placed on the blade guide bar 20. Also, inasmuch as the chain blade 22 passes through openings in the various parts of the guide 14, the chain blade 22 must be opened to facilitate the threading thereof through the various openings.

When ti is desired to utilize a chain saw 10 provided with the guide 14 for the topping of piling 12, there is nailed or otherwise secured to opposite sides of the piling 12 a pair of spaced mounting bars 64. The mounting bars 64 are disposed level when it is desired to top the piling 12 at a uniform height.

After the mounting bars 64 have been positioned with respect to the piling 12, the saw 10 is mounted thereon with the first guide member 26 and the second guide element 40 resting upon their respective mounting bars 64, as is best illustrated in Figure 3. Inasmuch as the second guide element 40 has the lower corners thereof rounded as at 66 in the same manner as is the first guide member 26, it will be seen that the guide 14 together with the saw 10 may smoothly slide along the mounting bars 64 to cut the piling 12 off at a predetermined level.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A chain saw guide comprising a first guide member adapted to be fixedly secured to a saw guide bar, a second guide member adapted to be secured to a saw guide bar in spaced relation relative to said first guide member, said second guide member including a fixed guide element and a movable guide element, said movable guide element being movable relative to said first guide member and a saw guide bar, said movable guide element being resiliently mounted, said first guide member and said fixed and movable guide elements having central elongated slots of a size to guidingly receive a saw guide bar, and outer pockets at opposite ends of and communicating with said slots, said outer pockets being relatively large and adapted to have a chain blade passed therethrough.

2. A chain saw guide comprising a first guide member adapted to be fixedly secured to a saw guide bar, a second guide member adapted to be secured to a saw guide bar in spaced relation relative to said first guide member, said second guide member including a fixed guide element and a movable guide element, said movable guide element being movable relative to said first guide member and a saw guide bar, said movable guide element being resiliently mounted, said first guide member and said fixed and movable guide elements having central elongated slots of a size to guidingly receive a saw guide bar, and outer pockets at opposite ends of and communicating with said slots, said outer pockets being relatively large and adapted to have a chain blade passed therethrough, clamp screws carried by said first guide member and said fixed guide element, said clamp screws extending into respective ones of said slots and being engageable with a saw guide bar.

3. A chain saw guide comprising a saw guide bar, a first guide member selectively fixed to said guide bar and supported directly thereby, a second guide member selectively fixed to said saw guide bar and supported directly thereby, said second guide member being spaced from said first guide member, said second guide member including a fixed guide element connected to said saw guide bar and a movable guide element carried by said fixed guide element, resilient means urging said movable guide element towards said first guide member for resiliently clamping piling between said movable guide element and said first guide member.

4. A chain saw guide comprising a saw guide bar, a first guide member selectively fixed to said guide bar and supported directly thereby, a second guide member selectively fixed to said saw guide bar and supported directly thereby, said second guide member being spaced from said first guide member, said second guide member including a fixed guide element connected to said saw guide bar and a movable guide element carried by said fixed guide element, resilient means urging said movable guide element toward said first guide member for resiliently clamping piling between said movable guide element and said first guide member, said first guide member and said movable guide element being similar configurations and disposed in parallel relation for guided movement along mounting bars.

5. A chain saw guide comprising a saw guide bar, a first guide member selectively fixed to said guide bar and supported directly thereby, a second guide member selectively fixed to said saw guide bar and supported directly thereby, said second guide member being spaced from said first guide member, said second guide member including a fixed guide element connected to said saw guide bar and a movable guide element carried by said fixed guide element, resilient means urging said movable guide element towards said first guide member for resiliently clamping piling between said movable guide element and said first guide member, said first guide member, said fixed guide element and said movable guide element each having a central slot receiving said saw guide bar, and outer pockets for receiving portions of a chain blade.

References Cited in the file of this patent
UNITED STATES PATENTS

| | | |
|---|---|---|
| 851,302 | McClune | Aug. 23, 1907 |
| 1,617,565 | Bens | Feb. 15, 1927 |
| 1,861,162 | Quist | May 31, 1932 |
| 2,361,422 | Sims | Oct. 31, 1944 |
| 2,642,901 | Hayden | June 23, 1953 |